No. 858,095. PATENTED JUNE 25, 1907.
C. D. MONTE, DEC'D.
V. J. MONTE, ADMINISTRATRIX.
PEELING OF FRUITS AND VEGETABLES.
APPLICATION FILED FEB. 23, 1907.
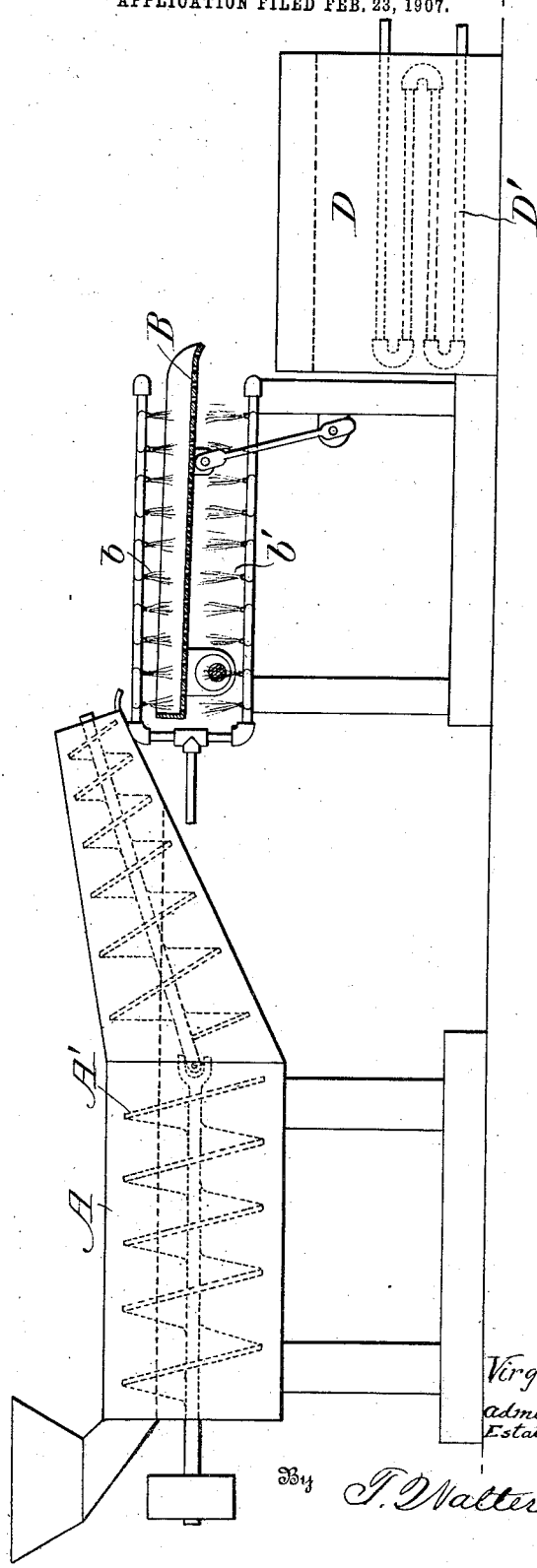

UNITED STATES PATENT OFFICE.

VIRGINIA J. MONTE, OF WOODLAND, CALIFORNIA, ADMINISTRATRIX OF CIPRIANO D. MONTE, DECEASED.

PEELING OF FRUITS AND VEGETABLES.

No. 858,095.      Specification of Letters Patent.      Patented June 25, 1907.

Application filed February 23, 1907. Serial No. 358,834.

*To all whom it may concern:*

Be it known that CIPRIANO D. MONTE, deceased, who was a citizen of United States and resided at Woodland, in the county of Yolo, and State of California, did invent new and useful Improvements in the Peeling of Fruits and Vegetables, of which the following is a specification.

My invention relates to a new and useful process of peeling fruits and vegetables by first subjecting them to the action of a solution whereby the skins are first loosened from the meat, and then removed by the force of hydraulic or other jets after which the peeled fruit or vegetable is subjected to a bath of cold water for the purpose of cleansing the fruit and eliminating any remaining traces of solution, and removing any adhering particles of skin. If the fruits or vegetables under treatment are under-ripe, the temperature of the final fluid bath is raised for the purpose of blanching said fruit or vegetable.

The essential objects of the present invention are, to provide a simple and effective process for quickly removing the skins from fruits and vegetables in a commercial manner, and to sterilize the peeled fruits or vegetables and prepare the same for the subsequent operation of canning.

The drawing illustrates diagrammatically one form of apparatus by which my process may be carried out.

My process is applicable to all kinds of fruits such as peaches, apricots, pears, etc., and vegetables, such as tomatoes, beets and the like. Drupaceous fruits, such as peaches and apricots, are usually pitted before being subjected to my process this pitting being done by any of the methods now employed for this purpose, and usually after the fruit has been graded as to size, variety and condition. In giving out fruit to operatives for halving and pitting, or to pitting machines, the largest size and best fruit should be first given to be followed by lower grades in sequence. The operatives usually make five (5) grades, viz:—perfect green fruit; imperfect green fruit; ripe and sound perfect fruit; ripe imperfect fruit; and pie or lowest grade of fruit.

The fruit having been first graded in the manner well known in this art, the high grade is preferably first treated, then the succeeding lower grades, leaving the lowest grade to the last; this is because the sound green fruit usually requires a greater length of treatment at certain stages in the process, than the soft ripe fruit, so that by the time the higher grade has been treated, the solution which I use in my process as I will presently explain is about right for the next lower grade of fruit.

Whatever the grade of fruit, said fruit—halved in the case of drupaceous fruits—is dumped into a tank A containing a heated solution, as caustic soda, which attacks the skin of the fruit and breaks and loosens the same. The solution tank, A, should have a conveyer, A', or other means for causing the fruit to be advanced therethrough and to be finally delivered out of the tank and upon a movable carrier, B, which, in practice, is best made of some open-work or reticulated construction, said carrier having either a shaking motion or an endless travel over suitably placed drums at the ends, and being driven at any appropriate speed from any desired point and source of power. The skin of the fruit having been loosened by the action of the solution, the fruit is next brought, in a layer one deep, into the range of action of appropriate opposed or other jets $b$, $b'$, of water, which impinge with more or less force upon all sides of the fruit, forcibly remove the now loosened skins piece after piece, and thoroughly rinse the peeled fruit. The extent of spraying will, of course depend upon the condition of the fruit being treated, because if the fruit is over-ripe it can stand less spraying and less force from the jets than when the fruit is greener or firmer, but in any event the force of the jets will be so regulated that while sufficient for all peeling and cleansing purposes, it should not be sufficient to tear or mutilate the meat.

The extent of the zone wherein the fruit is subjected to the sprays is sufficient for all peeling and washing purposes; in fact, the strength of the solution and the amount of spraying will be governed by the condition of the fruit as one variety will require more than another. This, however, the operator learns by experience. The strength of the solution in the tank A varies with the fruit as does the amount used in a stated time. When the skin is sufficiently loosened to allow of the sprays removing the same from the meat, that is the proper degree, and it should be maintained at that point. Having thus peeled the fruit by the combined action of the solution and fluid-jet means, I next subject the peeled fruit to the action of a cold-water bath in a tank D, for the purpose of cleansing the fruit and eliminating therefrom any remaining traces of the solution, and any particles of loose skin that may still adhere to the fruit. The fruit is now ready for the can, having been thoroughly washed, and peeled so that it is absolutely clean from a sanitary point.

It is well recognized in the art of canning that the condition of the fruit received from the growers, governs the quality produced. In the case of peaches, for instance, if they are sound, ripe and free from blemishes, there will be but a small amount of waste and very little labor necessary, but if the fruit is decayed, scaly, or full of fungous growths, it will require more labor in grading, peeling and removing such blemishes. Consequently the great advantage of my process over the hand method lies in the saving of labor, peeling and size. The saving in labor varies according to the amount paid for hand work but has averaged 10 cents per 50 lbs. of fruit. In peeling by hand, the waste in peeling amounts to about 12½ lbs. to 50 lbs. of fruit or approximately 25%. There is also the saving in size of the fruit. A 2¼″ peach when peeled by hand will not measure more than 2″ on the average; when peeled by my process the peach comes out approximately its original size; (if the fruit is properly graded as before explained). By thus retaining the size of the fruit, a higher grade of canned product is obtained as the low grades are always the smaller in size. Also, by removing only the thin film representing the peel, those properties of the fruit which lie nearest the skin and contribute so largely to the natural taste of the fruit, are retained thus improving the eating qualities of the canned product.

The three essential points therefore of saving in labor, peeling and size are important in estimating the economies of my process over the hand method.

The operation on vegetables is substantially the same as on fruits. In vegetables like tomatoes it is not necessary to grade them in the first instance. If the tomatoes are sound, and free from blemishes they come out peeled and whole, it being understood that the amount of solution in the tank A, and the force of the sprays will be governed by the condition of the tomatoes or other vegetable, or fruit, undergoing treatment. If the fruits or vegetables being treated are unripe, I heat the water in the tank D, which tank is shown having a heating coil D′, for the purpose of blanching this unripe fruit.

Having thus described my invention what I claim as new and desire to secure by Letters Patent is:—

1. The process herein described of peeling fruits and vegetables which process consists in subjecting the fruit or vegetable to a bath of disintegrating solution for the purpose of loosening the skin thereof; and then passing the fruit into the range of action of hydraulic sprays of sufficient force to remove the loosened skin.

2. The process herein described of peeling fruits and vegetables said process consisting in subjecting the fruit or vegetable to a bath of disintegrating solution for the purpose of loosening and breaking the skin of the fruit, or vegetable; then passing the fruit or vegetable into the range of action of opposed hydraulic sprays of sufficient force to remove the loosened skin; and then subjecting the peeled fruit or vegetable to a fluid bath of low temperature for the purpose of eliminating any remaining traces of solution.

3. The process herein described of peeling fruits and vegetables said process consisting of the subjection of the fruit or vegetable to a bath of disintegrating solution whereby the skin of the fruit or vegetable is broken and loosened; then passing the fruit or vegetable into the range of action of opposed hydraulic sprays of sufficient force to detach the loosened skin; then washing the peeled fruit or vegetable in cold water to eliminate any remaining traces of solution, and, if the fruit or vegetable is unripe, heating this final bath to blanch the fruit or vegetable.

4. The process herein described of peeling fruits and vegetables, which process consists in subjecting the fruit or vegetable to the action of a disintegrating solution having the capacity to disintegrate and loosen the skin thereof, and then subjecting the fruit or vegetable so treated to the action of fluid sprays and substantially coördinately therewith imparting motion to the fruit or vegetable.

In testimony whereof I have hereunto set my hand in presence of two subscribing witnesses.

VIRGINIA J. MONTE,
*Administratrix of the estate of Cipriano D. Monte, deceased.*

Witnesses:
CHAS. E. TOWNSEND,
FREDERICK E. MAYNARD.